United States Patent [19]

Yoo

[11] Patent Number: 5,392,649
[45] Date of Patent: Feb. 28, 1995

[54] FINGER PRESSURE GAUGE

[76] Inventor: Tae W. Yoo, 807, 1-Dong, Hanyang, Apt. 32-5, Banpo-dong, Seocho-ku, Seoul, Rep. of Korea

[21] Appl. No.: 159,846

[22] Filed: Nov. 30, 1993

[30] Foreign Application Priority Data

Mar. 16, 1993 [KR] Rep. of Korea .......... 933827

[51] Int. Cl.6 .......................................... A63B 23/00
[52] U.S. Cl. ....................................... 73/379.01; 482/44
[58] Field of Search ............ 73/379.01, 379.02, 379.03, 73/379.08, 744; 482/44, 47, 48, 49; 116/314, 322, 323, 324

[56] References Cited

U.S. PATENT DOCUMENTS 2,044,005  6/1936  Klein et al. ............................ 73/744
4,742,714  5/1988  Huang ................................... 73/744
4,970,899  11/1900 Huang ................................... 73/744
5,156,581  10/1992 Chow ..................................... 482/47

Primary Examiner—Richard E. Chilcot, Jr.
Assistant Examiner—R. Biegel
Attorney, Agent, or Firm—Richard M. Goldberg

[57] ABSTRACT

A finger pressure gauge capable of checking finger pressure conveniently and scientifically includes an inner case having a guide pin and a rack, an outer case receiving the inner case and having a pinion corresponding to the rack, wherein the inner case and outer case are retained by an elastic spring provided between them, and a dial covered with a window to show the finger pressure with a hand connected to the pinion, by which a patient can check on his recovery rate during curing by Chinese medicine.

19 Claims, 4 Drawing Sheets

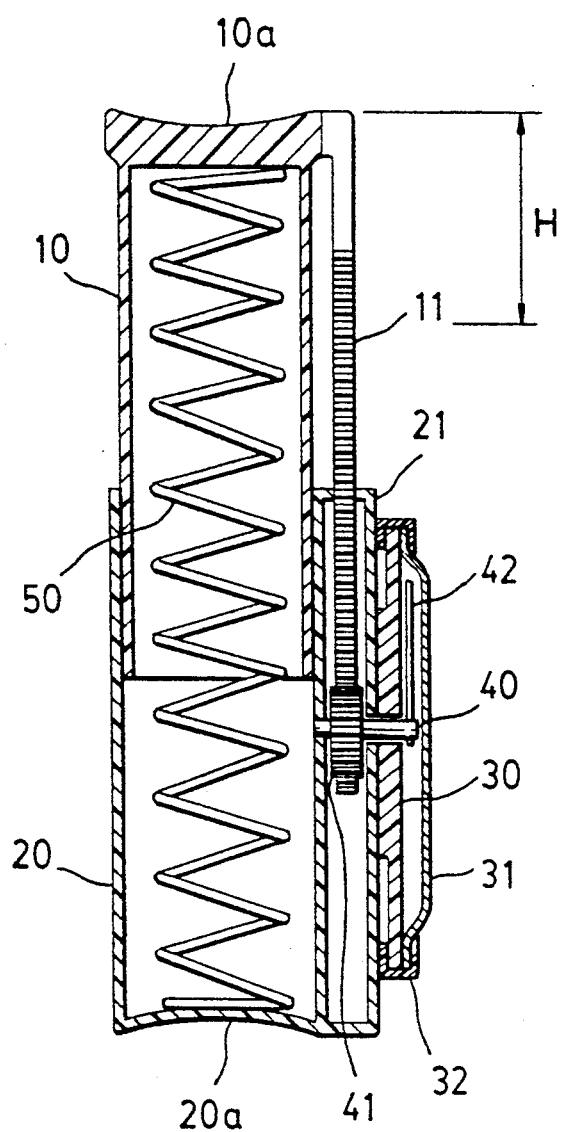
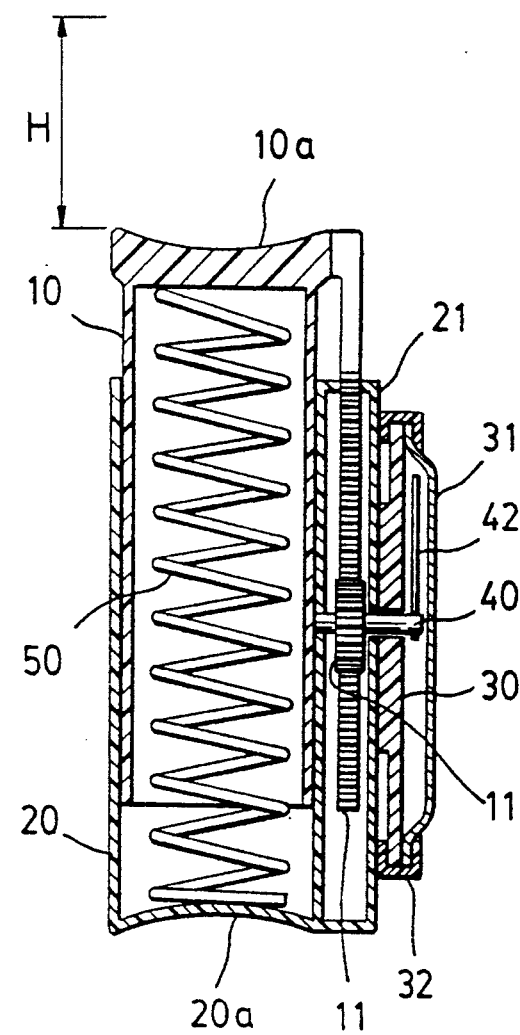

FINGER PRESSURE GAUGE

BACKGROUND OF THE INVENTION

1. Field of the Invention

This invention relates to a finger pressure gauge, more specifically to a gauge for finger pressure by which a patient suffering from wounds in his finger can check on his recovery rate during curing by Chinese medicine such as moxibustion with a moxa, characterized by checking easily on his recovery rate by watching a dial of the gauge.

2. Prior Art

At present, to check the finger pressure to investigate the extent of illness, a herbalist (herbdoctor) checks on his patients by watching or by touching their hands directly with his hand. There are, however, many problems in applying the above unscientific method because he can not investigate the extent of illness correctly due to inaccuracy in checking the finger pressure of his patients.

SUMMARY OF THE INVENTION

Therefore, an object of the present invention is to provide a finger pressure gauge showing a correct finger pressure of the patient on a dial by elasticity of a spring being pressed, so as to investigate the extent of his illness.

According to the invention, to accomplish the above object, there is provided a gauge for measuring finger pressure comprising an inner case and an outer case, in which an elastic member is included to oppose the finger pressure applied on the inner case and a dial has a hand to show the extent of finger pressure by pressing down the inner case to rotate a shaft being moved with a rack and pinion.

The features which are considered as characteristic of the invention are set forth in particular in the appended claims. However, the convenient and scientific gauge for measuring finger pressure according to the invention will be best understood upon perusal of the following detailed description with reference to the accompanying drawings.

BRIEF DESCRIPTION OF THE DRAWINGS

FIGS. 3(a) and (b) are cross-sectional views showing the operation of the FIG. 1 embodiment.

DETAILED DESCRIPTION OF THE INVENTION

Figure 1:
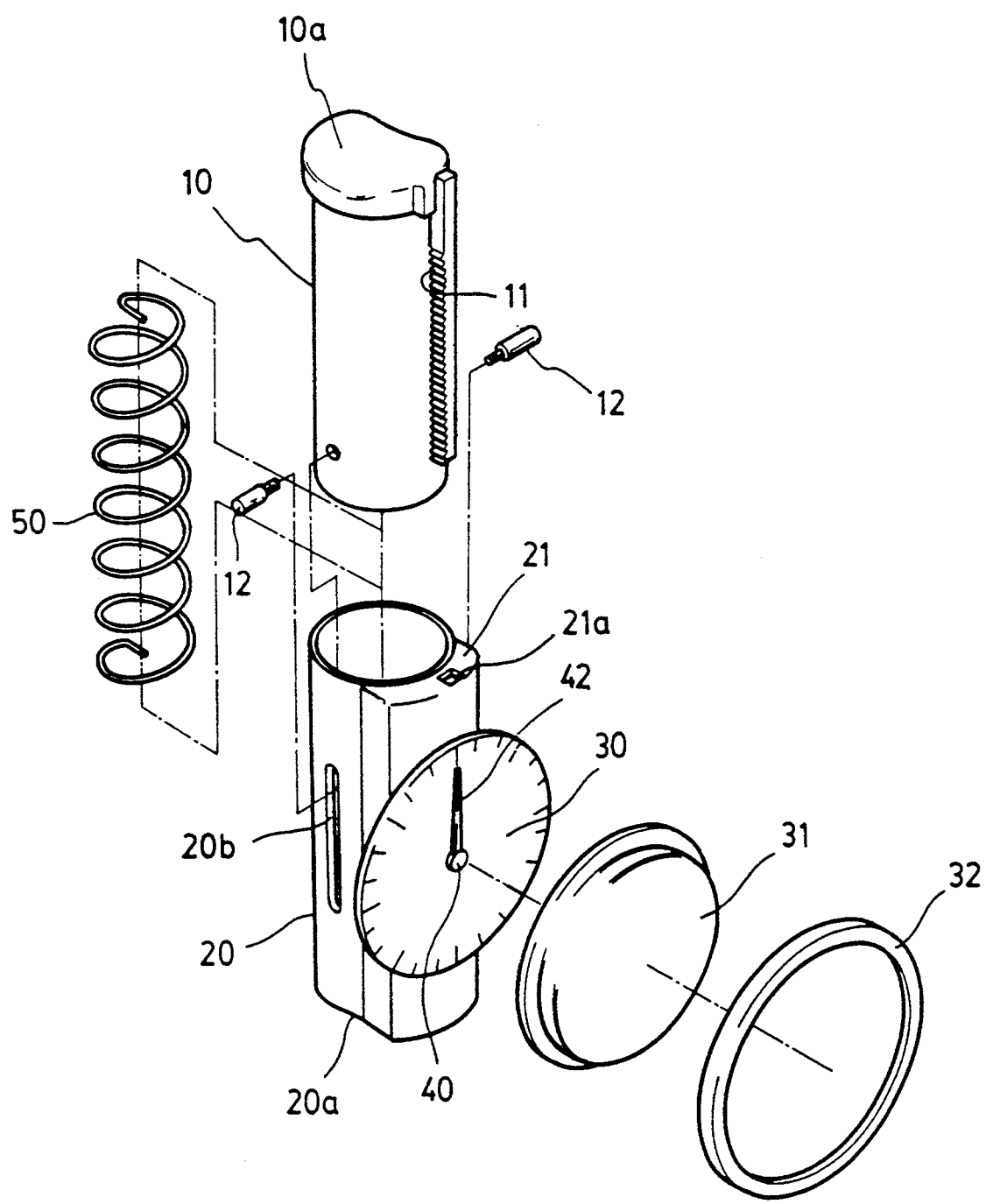
FIG. 1 is an exploded perspective view showing the parts of the invention embodiment.
Figure 2:
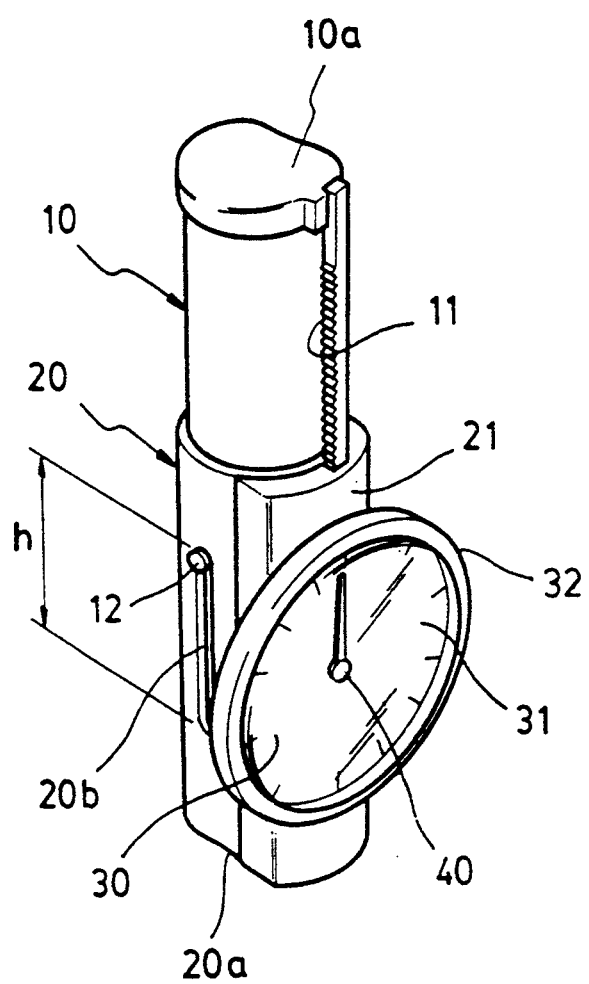
FIG. 2 is a perspective view showing the assembled embodiment of FIG. 1.

FIG. 1 and FIG. 2 are an exploded and an assembled perspective of the gauge according to the invention, respectively. In FIG. 1, the finger pressure gauge basically comprises an inner case 10 and an outer case 20, in which inner case 10 has a guide pin 12 fixed on inner case 10 to move up and down in a guide groove 20b when combining inner case 10 with outer case 20 in which a spring 50 is retained as an elastic member.

A rack 11 formed on a side of inner case 10 is in meshing relation with a pinion 41 in a protruded case 21 formed as part of outer case 20, as shown in FIGS. 3(a) and (b). A rotating shaft 40 passing through pinion 41 has a hand 42 in a window 31 fixed around a dial 30 with a bonding flange 32, so that the extent of finger pressure applied on inner case 10 is shown on dial 30 through rack and pinion action.

Referring to the drawings, reference numerals 10a and 20a designate touching sides, and 21a is a receiving hole for rack 11.

A further description of the function and effect of the invention will be given as follows.

Returning to FIGS. 3(a) and (b) and referring to the operation of the invention, outer case 20 receives inner case 10 elastically retained by spring 50 in it.

Because rack 11 formed on one side of inner case 10 is in meshing relation with pinion 41 in protruded case 21 of outer case 20, the amount of finger pressure given between touching sides 10a and 20a can be expressed on dial 30 by rotating hand 42 fixed on one side of rotating shaft 40 through rack and pinion action. That is, by that function, the patient can examine the extent of his illness or health by confirming his finger pressure conveniently on the dial.

During descent of inner case 10 into outer case 20, guide pin 12 fixed on inner case 10 moves down in guide groove 20b. As shown in FIGS. 3(a) and 3(b), a travel distance H of inner case 10 is restricted by the length H of guide groove 20b shown in FIG. 2 because guide pin 12 moves down and up only in guide groove 20b by elastic force of spring 50.

On dial 30, hand 42 connected with shaft 40 of the rack and pinion arrangement points to the finger pressure applied between touching sides 10a and 20a. The edge window 31 made from glass or transparent synthetic resins on dial 30 is joined to the dial with bonding flange 32.

Figure 4:
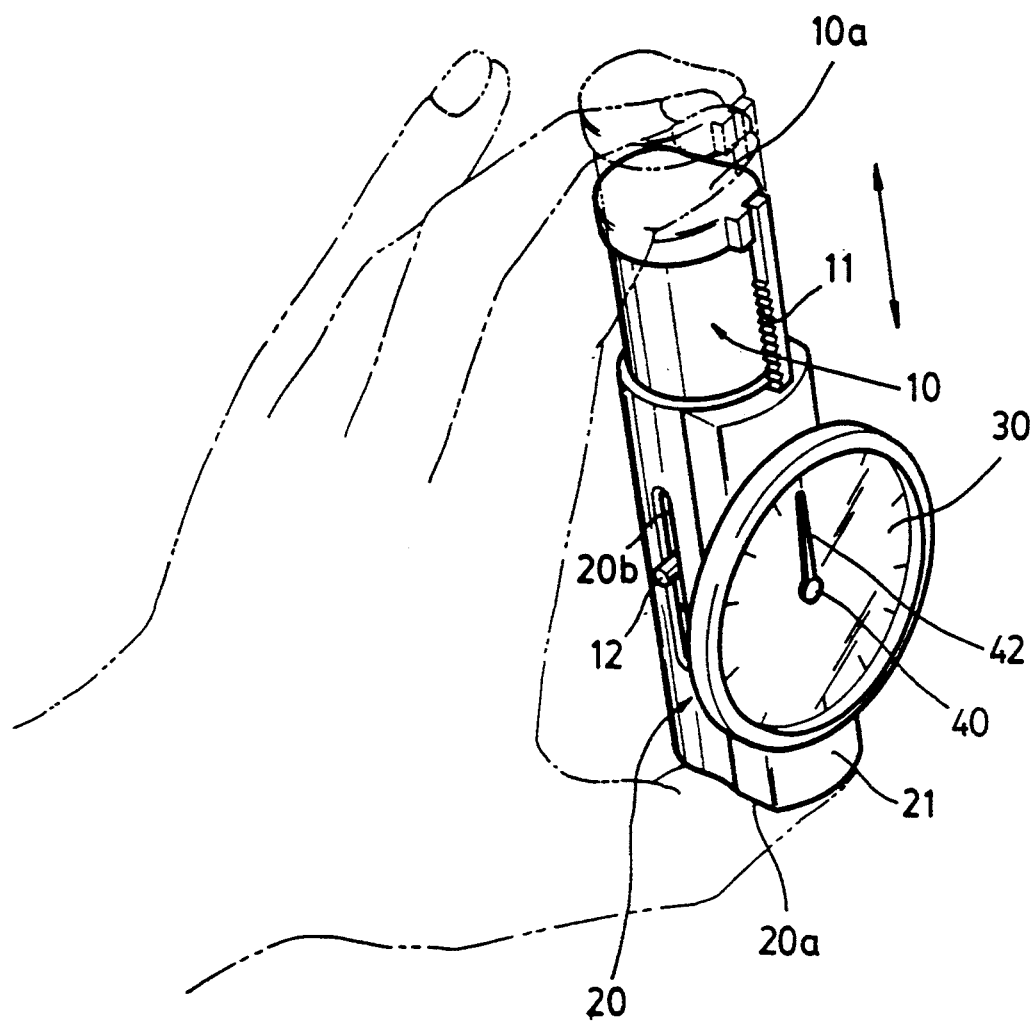
FIG. 4 is a perspective view showing the use of the FIG. 1 embodiment.

FIG. 4 is a perspective view showing the use of the finger pressure gauge. In the figure, it is evident that finger pressure applied between touching sides 10a and 20a having curved surfaces according to the shape of the fingers, can be expressed conveniently on dial 30.

As mentioned above, according to the invention, a convenient and scientific gauge for measuring finger pressure is provided which comprises inner case 10 having rack 11 formed on one side of it, outer case 20 receiving inner case 10 and having pinion 41 in protruded case 21 of one side of it corresponding to rack 1, the inner and outer case being biased apart with elastic spring 50, and dial 30 covered with window 31 to show finger pressure with hand 42 connected to shaft 40 of pinion 41.

What is claimed is:

1. A finger pressure gauge for checking finger pressure, comprising:
    an inner case including:
        a guide pin extending therefrom,
        and a rack formed on one side thereof, and
        an upper surface for receiving a first finger of a person,
    an outer case for slidable receiving the inner case therein, said outer case including:
        guide groove means for receiving the guide pin for sliding movement therein and for limiting slidable movement of said inner case relative to said outer case,
        protruded portion means for slidably receiving said rack therein,
        pinion means, rotatably mounted in said protruded portion means, for meshing with said rack, and a lower surface for receiving a second finger of a person such that said inner and outer cases can be biased toward each other between the first and second fingers when pressure is applied by the first and second fingers on the upper and lower surfaces, a hand connected with said pinion means for rotation therewith, spring means for biasing said inner case and said outer case apart, and dial means mounted to said protruded portion means for displaying a measurement of finger pressure in conjunction with said hand when fingers of a person depress said inner case into said outer case against the force of said spring means.

2. A finger pressure gauge according to claim 1, wherein said spring means includes a coil spring mounted in said inner case and said outer case and having one end pressing against an inner surface of said inner case and an opposite end pressing against an inner surface of said outer case to bias said inner case and said outer case apart.

3. A finger pressure gauge according to claim 1, wherein said pinion means includes a pinion gear in meshing engagement with said rack, and shaft means on which said pinion gear is fixed for rotatably mounting said pinion gear in said protruded portion means.

4. A finger pressure gauge according to claim 3, wherein said dial means includes an indicia dial having measuring indicia thereon and a hand secured to said pinion gear through said shaft means and which rotates with said shaft means upon movement of said rack so as to point to different ones of said indicia to display a measurement of said finger pressure.

5. A finger pressure gauge according to claim 4, wherein said dial means further includes a window for covering said indicia dial and said hand, while permitting viewing thereof.

6. A finger pressure gauge according to claim 1, wherein said upper and lower surfaces are directly opposed to each other along a common axial line of said gauge.

7. A finger pressure gauge for checking finger pressure, comprising:

an inner case including:
a rack formed on one side thereof, and
an upper surface for receiving a first finger of a person, an outer case for slidably receiving the inner case therein, said outer case including:
protruded portion means for slidably receiving said rack therein,
pinion means, rotatably mounted in said protruded portion means, for meshing with said rack, and
a lower surface for receiving a second finger of a person such that said inner and outer cases can be biased toward each other between the first and second fingers when pressure is applied by the first and second fingers on the upper and lower surfaces, a hand connected with said pinion means for rotation therewith, spring means for biasing said inner case and said outer case apart, and dial means mounted to said protruded portion means for displaying a measurement of finger pressure in conjunction with said hand when fingers of a person depress said inner case into said outer case against the force of said spring means.

8. A finger pressure gauge according to claim 7, wherein said spring means includes a coil spring mounted in said inner case and said outer case and having one end pressing against an inner surface of said inner case and an opposite end pressing against an inner surface of said outer case to bias said inner case and said outer case apart.

9. A finger pressure gauge according to claim 7, wherein said pinion means includes a pinion gear in meshing engagement with said rack, and shaft means on which said pinion gear is fixed for rotatably mounting said pinion gear in said protruded portion means.

10. A finger pressure gauge according to claim 9, wherein said dial means includes an indicia dial having measuring indicia thereon and a hand secured to said pinion gear through said shaft means and which rotates with said shaft means upon movement of said rack so as to point to different ones of said indicia to display a measurement of said finger pressure.

11. A finger pressure gauge according to claim 10, wherein said dial means further includes a window for covering said indicia dial and said hand, while permitting viewing thereof.

12. A finger pressure gauge according to claim 7, wherein said upper and lower surfaces are directly opposed to each other along a common axial line of said gauge.

13. A finger pressure gauge for checking finger pressure, comprising:

an inner case including:
a rack formed on one side thereof, and
an upper surface for receiving a first finger of a person, an outer case for slidably receiving the inner case therein, said outer case including:
a lower surface for receiving a second finger of a person such that said inner and outer cases can be biased toward each other between the first and second fingers when pressure is applied by the first and second fingers on the upper and lower surfaces, pinion means, rotatably mounted to said outer case, for meshing with said rack, a hand connected with said pinion means for rotation therewith, spring means for biasing said inner case and said outer case apart, and dial means mounted to said outer case for displaying a measurement of finger pressure in conjunction with said hand when fingers of a person depress said inner case into said outer case against the force of said spring means.

14. A finger pressure gauge according to claim 13, further comprising:
a guide pin extending from the inner case, and
guide groove means in the outer case for receiving the guide pin for sliding movement therein and for limiting slidable movement of said inner case relative to said outer case.

15. A finger pressure gauge according to claim 13, wherein said spring means includes a coil spring mounted in said inner case and said outer case and having one end pressing against an inner surface of said inner case and an opposite end pressing against an inner surface of said outer case to bias said inner case and said outer case apart.

16. A finger pressure gauge according to claim 13, wherein said pinion means includes a pinion gear in meshing engagement with said rack, and shaft means on which said pinion gear is fixed for rotatably mounting said pinion gear to said outer case.

17. A finger pressure gauge according to claim 16, wherein said dial means includes an indicia dial having measuring indicia thereon and a hand secured to said pinion gear through said shaft means and which rotates with said shaft means upon movement of said rack so as to point to different ones of said indicia to display a measurement of said finger pressure.

18. A finger pressure gauge according to claim 17, wherein said dial means further includes a window for covering said indicia dial and said hand, while permitting viewing thereof.

19. A finger pressure gauge according to claim 13, wherein said upper and lower surfaces are directly opposed to each other along a common axial line of said gauge.

* * * * *